(12) United States Patent
Bozkaya et al.

(10) Patent No.: US 8,443,006 B1
(45) Date of Patent: *May 14, 2013

(54) DATA PROPAGATION IN A MULTI-SHARD DATABASE SYSTEM

(75) Inventors: Tolga Bozkaya, Belmont, CA (US); David L. Butcher, San Mateo, CA (US); Andrew Chang Huang, Menlo Park, CA (US); Wendy Tobagus, Mountian View, CA (US); Dan Moisa, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/525,561

(22) Filed: Jun. 18, 2012

Related U.S. Application Data

(63) Continuation of application No. 13/210,511, filed on Aug. 16, 2011, now Pat. No. 8,209,284, which is a continuation of application No. 12/133,193, filed on Jun. 4, 2008, now Pat. No. 8,037,024.

(51) Int. Cl.
*G06F 17/30* (2006.01)

(52) U.S. Cl.
USPC .......................................................... 707/799

(58) Field of Classification Search .................... 707/799
See application file for complete search history.

(56) References Cited

U.S. PATENT DOCUMENTS

| | | | | |
|---|---|---|---|---|
| 5,327,557 A * | 7/1994 | Emmond | | 707/741 |
| 5,761,724 A | 6/1998 | Jhon et al. | | |
| 5,924,097 A * | 7/1999 | Hill et al. | | 707/703 |
| 5,933,837 A * | 8/1999 | Kung | | 707/635 |
| 5,974,414 A * | 10/1999 | Stanczak et al. | | 379/88.2 |
| 6,615,215 B1 * | 9/2003 | Petty | | 707/799 |
| 6,710,786 B1 | 3/2004 | Jacobs et al. | | |
| 7,030,857 B2 * | 4/2006 | O'Keeffe et al. | | 345/163 |
| 7,107,283 B2 * | 9/2006 | Seifi | | 707/797 |
| 7,730,077 B2 * | 6/2010 | Hinshaw et al. | | 707/754 |
| 7,844,973 B1 * | 11/2010 | Dice | | 718/108 |
| 7,904,481 B1 * | 3/2011 | Deka et al. | | 707/799 |
| 8,032,561 B1 * | 10/2011 | Nadj et al. | | 707/799 |
| 8,078,820 B2 * | 12/2011 | Michaylov et al. | | 711/168 |
| 2007/0180075 A1 | 8/2007 | Chasman et al. | | |
| 2008/0313238 A1 | 12/2008 | McKenney et al. | | |
| 2011/0137953 A1 * | 6/2011 | Bobick et al. | | 707/799 |

* cited by examiner

*Primary Examiner* — Baoquoc N To
(74) *Attorney, Agent, or Firm* — Fish & Richardson P.C.

(57) ABSTRACT

Methods, systems and apparatus, including computer program products, for propagating data across shards of a database system are described. According to one method, a first request that includes instructions to place a second request in a queue of a second shard is placed in a queue of a first database shard, and the change is committed to the records of the first shard. A queue processor polling the queue fetches and dispatches the first request, placing the second request in a queue of a second database shard. The second request includes instructions for making the change to the second shard. A queue processor of the second database shard polls the queue of the second database, fetches the second request, and dispatches it to make the change on the second database shard.

20 Claims, 8 Drawing Sheets

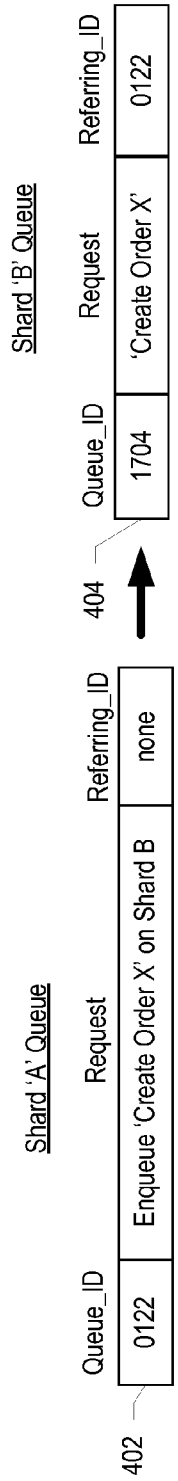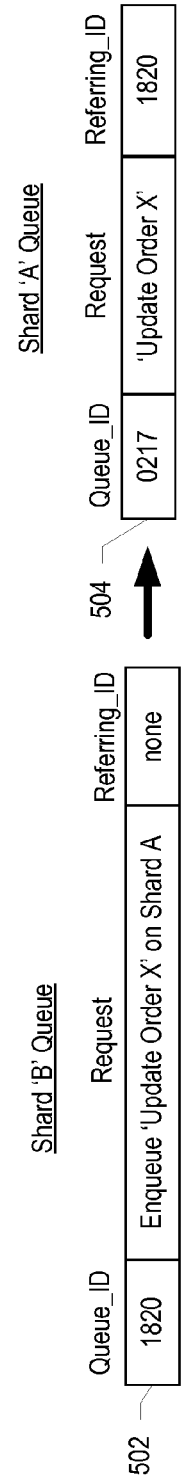

DATA PROPAGATION IN A MULTI-SHARD DATABASE SYSTEM

CROSS-REFERENCE TO RELATED APPLICATIONS

The present application is a continuation of U.S. patent application Ser. No. 13/210,511, filed Aug. 16, 2011, titled "DATA PROPAGATION IN A MULTI-SHARD DATABASE SYSTEM," which is a continuation of U.S. patent application Ser. No. 12/133,193, filed Jun. 4, 2008, titled "DATA PROPAGATION IN A MULTI-SHARD DATABASE SYSTEM," and issued as U.S. Pat. No. 8,037,024 on Oct. 11, 2011. The contents of the prior applications are incorporated herein by reference in their entirety.

BACKGROUND

The present disclosure relates to propagating data in a multi-shard database system.

Modern database systems provide rapid information storage, searching, and retrieval capabilities. These databases often interact with or are part of computer applications that collect, update, analyze, or report on large sets of data. Where those data sets are so large, and the demand for access thereto is so high that performance or storage thresholds of a single server are reached, data can be distributed across multiple servers to provide additional performance and storage capabilities. Each segment in such a distributed database system is known as a "shard". Functions of the individual shards can be assigned according to a strategy designed to distribute user loads and optimize performance of the database system.

Distributing or "sharding" the database in such a manner can overcome performance and storage limitations, but this segmentation introduces problems where database transactions require access to data that is stored in more than one shard (a cross-shard transaction). Cross-shard transactions can be resource intensive, and as a result, performance of the system can be hindered when such transactions take place. To handle cross-shard transactions, a distributed transaction mechanism (such as a two-phase commit) is conventionally used.

SUMMARY

This specification describes technologies relating to data storage and retrieval.

In general, one aspect of the subject matter described in this specification can be embodied in methods that include the actions of placing a first request in a queue of a first shard of a database system, the first request comprising instructions to place a second request in a queue of a second database shard. The second request can comprise instructions to duplicate a change of the first shard on the second shard. The change is committed to the first shard, and the first request is dispatched to place the second request in the second queue. Other embodiments include corresponding systems, apparatus, and computer program products.

In particular implementations, the method further includes the actions of dispatching the second request in the second queue to duplicate the change on the second shard. The first request can include an identifier, the identifier being copied to the second queue and associated with the second request. An indication can be stored in the first queue that the first request is complete.

In general, another aspect of the subject matter described in this specification can be embodied in methods that include the actions of placing a request in a queue of a first shard of a database system, the request comprising instructions to replicate a change of the first shard on a second database shard of the database system, committing the change to the first shard, and dispatching the request from the queue to replicate the change on the second shard.

Particular embodiments of the subject matter described in this specification can be implemented to realize one or more of the following advantages. Changes can be propagated across multiple shard database systems without the use of a traditional distributed transaction management mechanism.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a table illustrating example queue contents of two database shard queues used in the creation of an order.

FIG. 5 is a table illustrating example queue contents of two database shard queues used in updating an order.

FIG. 6 is a table illustrating example queue contents of a database shard queue having grouping parameters.

Like reference numbers and designations in the various drawings indicate like elements.

DETAILED DESCRIPTION

Figure 1:
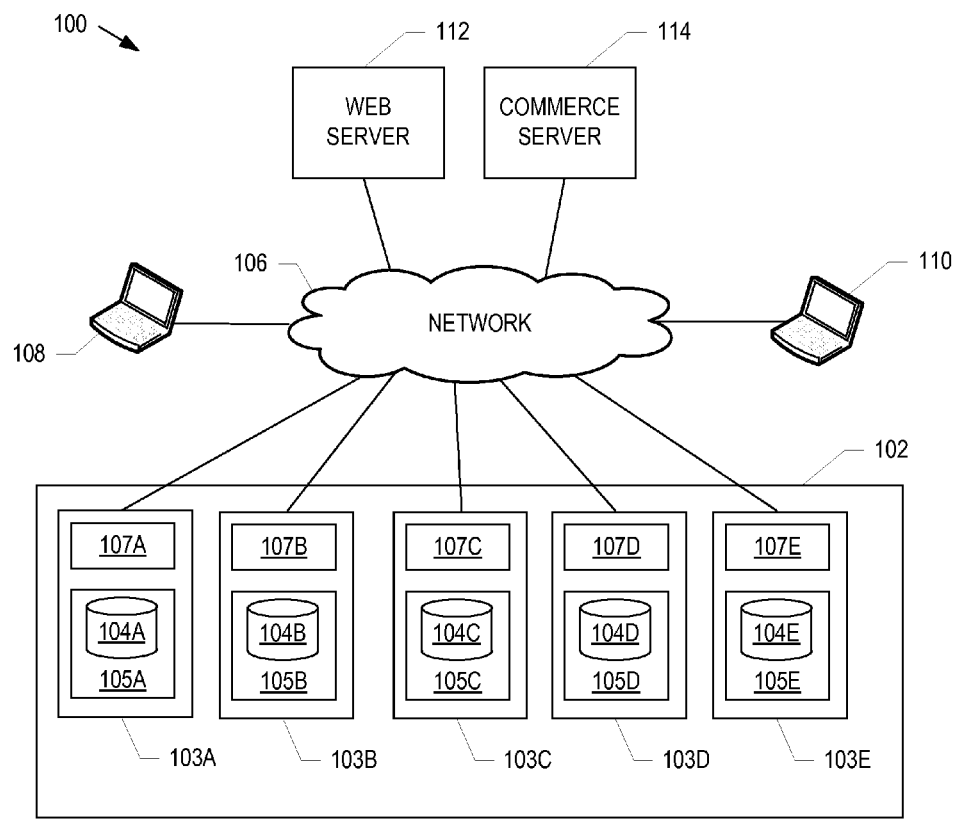
FIG. 1 is a block diagram of an example system including a database having multiple database shards.

FIG. 1 is a block diagram of an example system 100 including a database 102 having multiple database shards. The database shards 104A-104E include database software, such as a database application, and database records. The database records of a given shard are a subset of the records of the complete database system 102, and the shards 104A-104E can have a common database schema. The database shards 104A-104E reside in memory 105A-105E of servers 103A-103E having processors 107A-107E, for example, in magnetic disk memory. The records of the database system are spread across the shards 104A-104E in order to, for example, distribute database processing loads. The example system 100 includes respective servers 103A-103E for the database shards 104A-104E, in some implementations, however, more than one shard can reside in the memory of a single server.

The database shards 104A-104E can be placed in the same location or in two or more geographically separate locations The computers 108 and 110 can communicate with the shards 104A-104E using the network 106 to store records on and retrieve records from the shards, or the computers 108 and 110 can access one or more interface servers, such as web server 112 or commerce server 114, which can act as intermediaries between the computers 108 and 110 and the database 102. Although shown separately, a web server application and a commerce server application can reside on the same server hardware.

In some implementations, one or more web servers 112 are used to provide an Internet accessible interface for a network commerce system that uses the shards 104A-104E for record storage and retrieval. Using a computer 108, a buyer can point an Internet browser to a URL representing a web server for a seller's website. The website presents a description of the seller's products available for purchase, and the buyer is able to select products for purchase.

The web server can link to or otherwise forward the buyer to one or more commerce servers 114 for accepting order information from the buyer. Alternatively, the web server can accept order information and forward the information to the commerce server 114. Order information is sent from the commerce server 114 and stored in the database system 102.

The buyer can use the computer 108 to access an interface of the web server or commerce server that retrieves order data from the database 102 for presentation on a display of the computer 108. The seller, or a seller representative, can use the computer 110 to access an interface of the web server 112 or commerce server 114 that retrieves order data corresponding to the seller. The seller can use this data to track, process, and eventually fulfill the order. During order processing the seller can also use the interface to update the progress of the order.

In some implementations, all records of order data for a given buyer are stored in a single shard (the buyer's "home shard"). This permits retrieval of a buyer's order information without requiring a resource intensive multi-shard query to retrieve all of the buyer's order information. In an implementation, all records of order data for a given seller are stored in a single shard (the seller's "home shard"). This permits retrieval of a seller's order information without requiring a resource intensive multi-shard query to retrieve all of the seller's order information.

Where buyer or seller order data is initially created and stored on a different shard than the buyer or seller's home shard, the database system 102 utilizes a process for propagating changes across the database shards to create a copy of the data on the buyer or seller's home shard so that the seller can see order data for orders placed by the buyer and the buyer can see order progress as the seller works to fulfill the order.

In an implementation, a method of propagating database changes operates in a manner which recognizes that a delay in propagating changes made in one shard to another shard is acceptable in some contexts. Where this is the case, the change is committed to a shard where having up to date information is contextually more significant, while the change in the second shard is queued for later processing. For example, in a commerce system that propagates changes between buyer and seller shards to avoid cross-shard queries, up to date information will at times be more significant at a buyer shard, while at others it will be more significant at a seller shard, depending on the context of a transaction.

In the case of order creation (an action initiated by a buyer), having up to date information at the buyer's shard as soon as possible following the order creation is more important at the buyer's shard than at the seller's shard. Records for the new order are therefore committed to the buyer's shard while changes to the seller's shard are handled using one or more queues. Placing the new order in the buyer's shard ensures that an order query performed on the buyer shard for the buyer's orders will include the newly created order. This enables the buyer to see the newly created order after it has been created. A time delay between the order being placed and it appearing in a seller's shard so that the seller can begin processing the order is, on the other hand, acceptable. There is no urgent need for the order to appear in a query of the seller's shard immediately, so the change to the seller shard is queued for later processing.

In the case of an order being updated by a seller (a seller initiated action), having up to date information at the seller's shard as soon as possible following the order being updated is more important at the seller's shard than at the buyer's shard. The update to the order is therefore committed to the seller's shard while changes to the buyer's shard are handled using one or more queues. Committing the update to the seller's shard permits the seller, viewing an order status listing, to see that actions taken in processing the order have been recognized by the database system. A time delay between the order being updated and change being propagated to the buyer's shard is acceptable. There is no urgent need for the update to appear in a query of the buyer's shard immediately, so the change to the buyer shard is queued for later processing.

Figure 2:
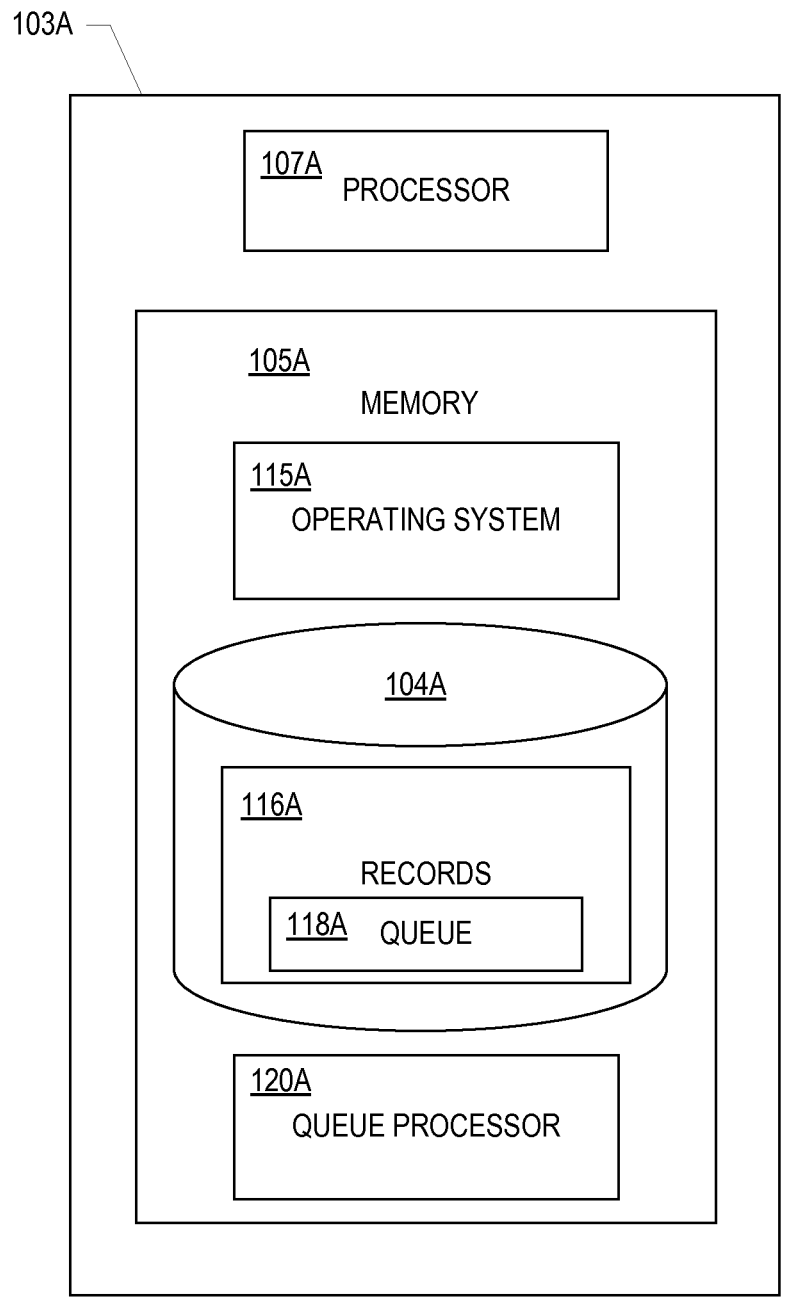
FIG. 2 is a block diagram of an example server including a database shard of a database system.

FIG. 2 is a block diagram of an example server 103A including a database shard 104A of a database system. The server 103A includes a processor 107A and memory 105A. The memory 105A can include transistor-based random access memory and magnetic disc memory. The memory 105A includes an operating system 115A, a database shard 104A, and a queue processor 120A. The memory 105A is accessible by the processor 107A which can store and retrieve information in the memory 105A and execute computer program code included in the memory 105A. The database shard 104A includes records 116A, and the records include order data and a queue 118A. The queue 118A is a table of requests to be performed by the queue processor 120A. The queue processor 120A is a computer process operating on computer hardware that polls the queue 118A to scan for requests to be performed. In some implementations, servers 103B-103E have respective records, queues, and queue processors. In some implementations, the computer process of the queue processor instead runs on computer hardware which is separate from the computer hardware where the records are stored. For example, the queue processor can run on a separate server and communicate with the server which stores the records to poll the queue and dispatch the queue requests.

Figure 3A:
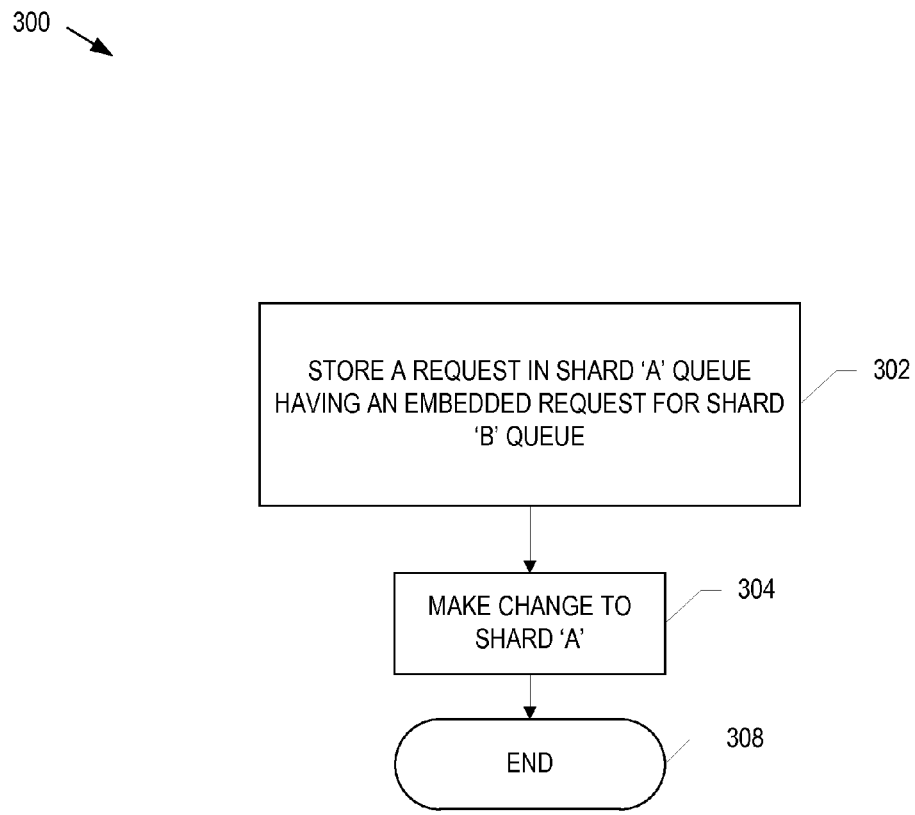
FIG. 3A is a flowchart of an example process for making a change at a database shard and enqueuing an embedded request.

FIG. 3A is a flowchart of an example process 300 for making a change at a database shard and enqueuing an embedded request. The change made in the process 300 can be propagated, for example, between a first shard 104A and a second shard 104B of the database system 102 by the processes described below in FIG. 3A and FIG. 3B. The combined process duplicates a change made on the first shard to the second shard. The change can be an insert, an update, or any other action used to modify the contents of a database.

In the process 300, upon the database system receiving information (e.g., from a web server or a commerce server) for making a change to records of a first shard, shard 'A' (e.g., information for creating a new order or for updating an existing order), that is to be duplicated to a second shard, shard 'B', a request is stored in the queue of shard 'A' that includes an embedded request to be placed into the queue of shard 'B' (302). The change is made to shard 'A' (304), and the process ends (308).

Figure 3B:
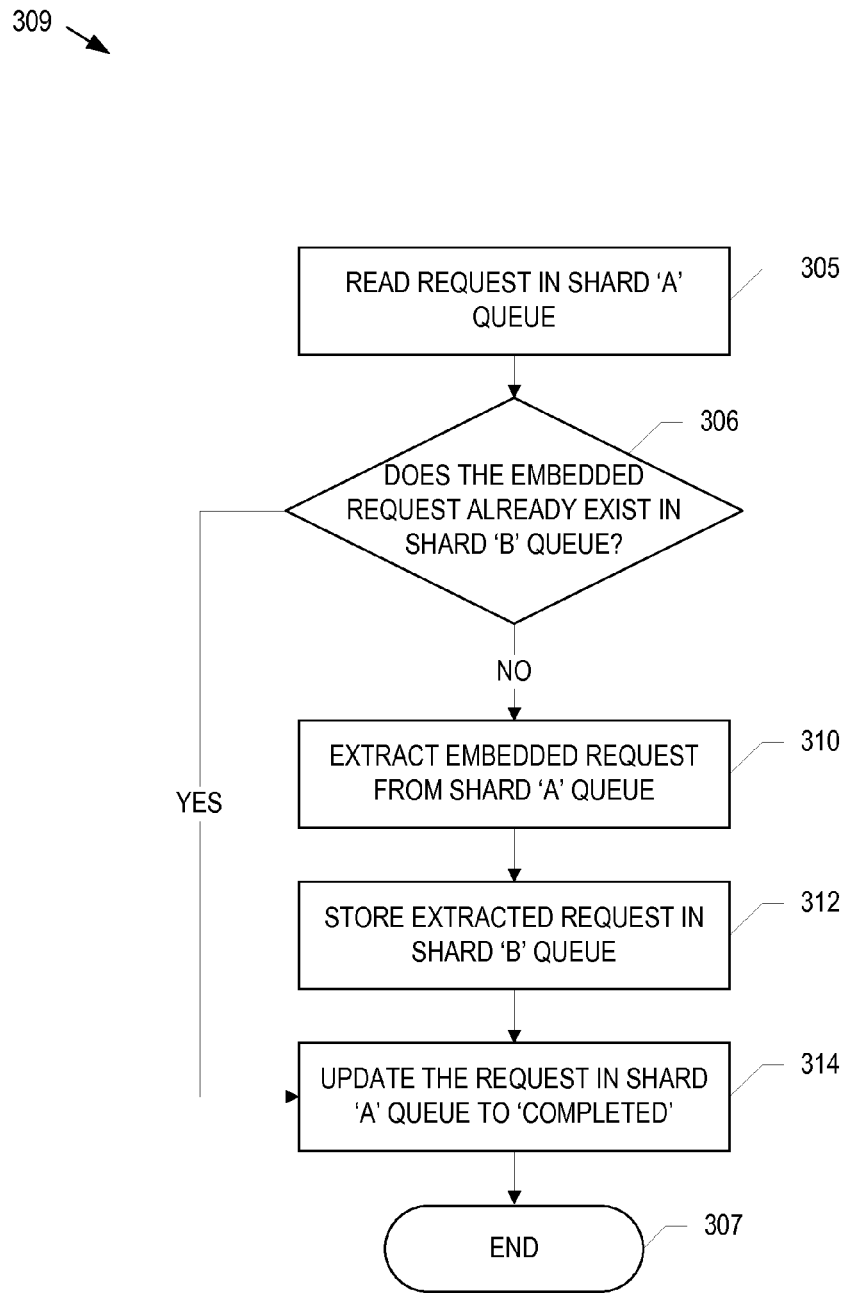
FIG. 3B is a flowchart of an example process for dispatching a request that includes an embedded request.

FIG. 3B is a flowchart of an example process 309 for dispatching a request that includes an embedded request. The process 309 can be used to dispatch the request stored in the shard 'A' queue in the example process 300 described above. The term "dispatched" is used herein to denote the fulfilling of a queue request by a queue processor. The shard 'A' queue is read (305), for example, by a queue processor polling the queue. The queue of shard 'B' is checked to determine if the request embedded in the shard 'A' queue request is already present in the shard 'B' queue (306). If it does exist in the shard 'B' queue then the request in shard 'A' is marked as completed (314) and the process ends (307). If the request is not present in the shard 'B' queue, the embedded request is extracted (310). The extracted request is stored in the shard 'B' queue (312) and the request in the shard 'A' queue is marked as completed (314), and the process ends (307).

Figure 3C:
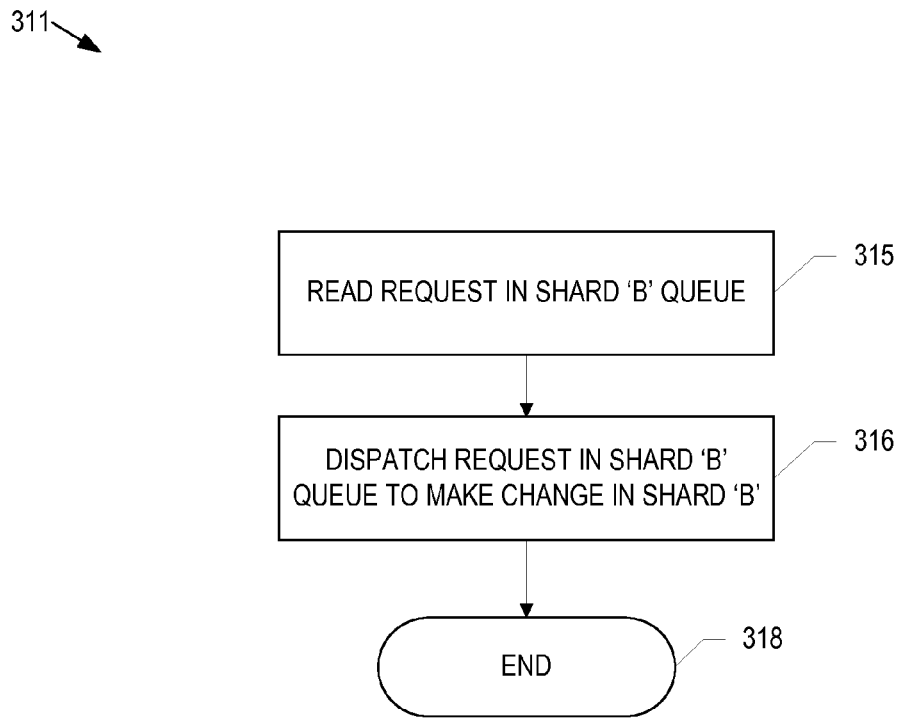
FIG. 3C is a flowchart of an example process for dispatching a request to update the records of a database shard.

FIG. 3C is a flowchart of an example process 311 for dispatching a request to update the records of a database shard. The process 311 can be used to dispatch the request stored in the shard 'B' queue in the example process 309 described above. The shard 'B' queue is read (315), for example, by a queue processor polling the queue. The request in the shard 'B' queue is then "dispatched" to duplicate the change to the records of shard 'B' (316), and the process ends 318.

In an implementation, the process of FIG. 3 is utilized by the network commerce system of FIG. 1. A buyer makes the inputs needed to create an order. The buyer's information is stored in shard 104A. The seller's information is stored in shard 104B. The order created by the buyer will be stored in shard 104A so that the order and the buyer's information are kept on the same shard to permit single shard queries for all of the buyer's orders. A database connection to shard 104A is opened in order to store the new order information in shard 104A. However, unless the order is duplicated to the seller shard, a single shard query of the seller shard will not include the order. A determination is made in the database system that a change to the records of shard 104A is pending that should be duplicated in the records of shard 104B. The open database connection to shard 104A enables database transactions to take place on shard 104A, making shard 104A the transacting shard.

The open database connection to the transacting shard is used to store an embedded request in the queue table of the transacting shard. Therefore, to duplicate the new order to the seller shard 104B, a request is stored in the queue 118A of the transacting shard 104A. The request includes an embedded request for the queue 118B of shard 104B. The new order is then stored in the records 116A of shard 104A, for example, by committing an insert action to place one or more new records in shard 104A. Following the storage of the embedded request in the queue of the transacting shard (302) and making the changes to the transaction shard (304), the database connection to the transacting shard, shard 104A, is closed.

Once the order is stored in the buyer shard the buyer can see the order using the tracking interface. Upon a buyer placing an order, the buyer expects to see that order in any order history information that he or she accesses. If the order was instead first stored on the seller shard, then there could be an undesirable delay in the order being viewable by the buyer in the tracking interface.

The request (having the embedded request) remains in the queue 118A of shard 104A until is it is processed (dispatched) by the queue processor 120A. The queue of a given shard can be serviced by a queue processor running on the server hardware where that shard resides, or alternatively, by a queue processor running on a separate machine. The queue processor 120A of server 103A periodically polls the queue 118A of shard 104A for requests that are ready to be dispatched. Upon polling the queue 118A, the queue processor 120A dispatches the request. In dispatching the request, the queue processor 120A opens a database connection to shard 104B and queries the queue 118B to determine if the embedded request has already been placed in the queue 118B. If the embedded request already exists in the queue 118B, the queue processor 120A closes the connection to shard 104B, and marks the request in the queue 118A as completed.

If the embedded request is not found in the queue 118B, then the queue processor 120A extracts the embedded request and stores it in the queue 118B. The extracted request stored in queue 118B includes a unique reference from the initial request so that later dispatches made by the queue processor 120A can check to determine if a given request has already been placed in the queue 118B. The queue processor 120A closes the database connection to shard 104B and marks the initial request in queue 118A as completed.

The extracted request remains in the queue 118B of the shard 104B until it is dispatched by the queue processor 120B. Upon polling the queue 118B, the queue processor 120B dispatches the request. The request includes instructions for making changes to the records 116B so that the order is placed in the records of the seller's shard. The queue processor makes the changes to the shard 104B records 116B. Once the order is in the seller's shard, the seller can see the order. Because all of the seller's orders are duplicated to the seller's shard, inexpensive (from a resource perspective) single shard queries allow all of the seller's orders to be retrieved and provided to the seller.

As the seller processes the order, updates to the progress of the order are stored on the seller shard 104B and these changes are duplicated to the buyer shard 104A using the same process (where the seller shard is the transacting shard and the roles of the two shards are reversed) to place the updated order information on the records 116A of shard 104A. In this case, the seller expects changes made to an order to be immediately indicated on any status screen that the seller accesses. The changes are committed to the seller shard and are immediately viewable on any status screen of an interface to the database.

There are multiple benefits of the described process. As already mentioned, it avoids the need for resource intensive multi-shard queries. It provides a reliable way to duplicate changes across shards without the use of a distributed transaction mechanism. The process can be completed while transacting on one shard using a single connection. That is, for example, the process of creating an order is transacted on a buyer's shard and only a single connection is needed (the buyer shard queue processor connection to the seller shard) to duplicate the order to the seller shard.

The reliability advantages provided by the process can be understood by considering a number of alternatives. To create an order on the buyer shard, changes could instead be committed to the buyer shard followed by opening a connection to the seller shard and committing the changes directly to the records of the seller shard. This alternative provides no guarantee that the commit operation to the seller shard will be successful following the changes being made to the buyer shard. If the changes are not made on the seller shard, but are made on the buyer shard, the buyer will believe that an order has been placed, but the seller will not know of the order's existence. The success of this alternative depends on the seller shard being up and available.

Another alternative is to open a connection to the seller shard, commit the changes to the seller shard, then make the changes on the buyer shard. This alternative similarly provides no guarantee that the changes will successfully be committed to the buyer shard at the end. The changes on the seller shard could be orphaned, possibly resulting in the buyer placing a second order. Again, the success of operations on the buyer shard depends on the seller shard being up and available.

Both of the alternatives described above are also deficient in that changes made to the second shard are not idempotent. An operation is idempotent if outcome of the operation is the same regardless of the number of times the operation is performed. If the duplicating operation is inadvertently performed more than once using either of the above described alternatives, multiple duplicate records are placed on the target shard.

The above mentioned disadvantages are not present in the process shown in FIG. 3. The use of an identifier as a back reference allows the queue of the target shard to be checked to determine if the change request has already been stored in the queue of the target shard. This prevents the creation of multiple duplicate records. The use of the queue and queue processor overcomes the need for the target shard to be running and available. If a database connection cannot be established with the target shard, the request will stay in the originating shard where the queue processor of the originating shard will attempt to perform it later and continue to do so until it is marked as completed.

Figure 3D:
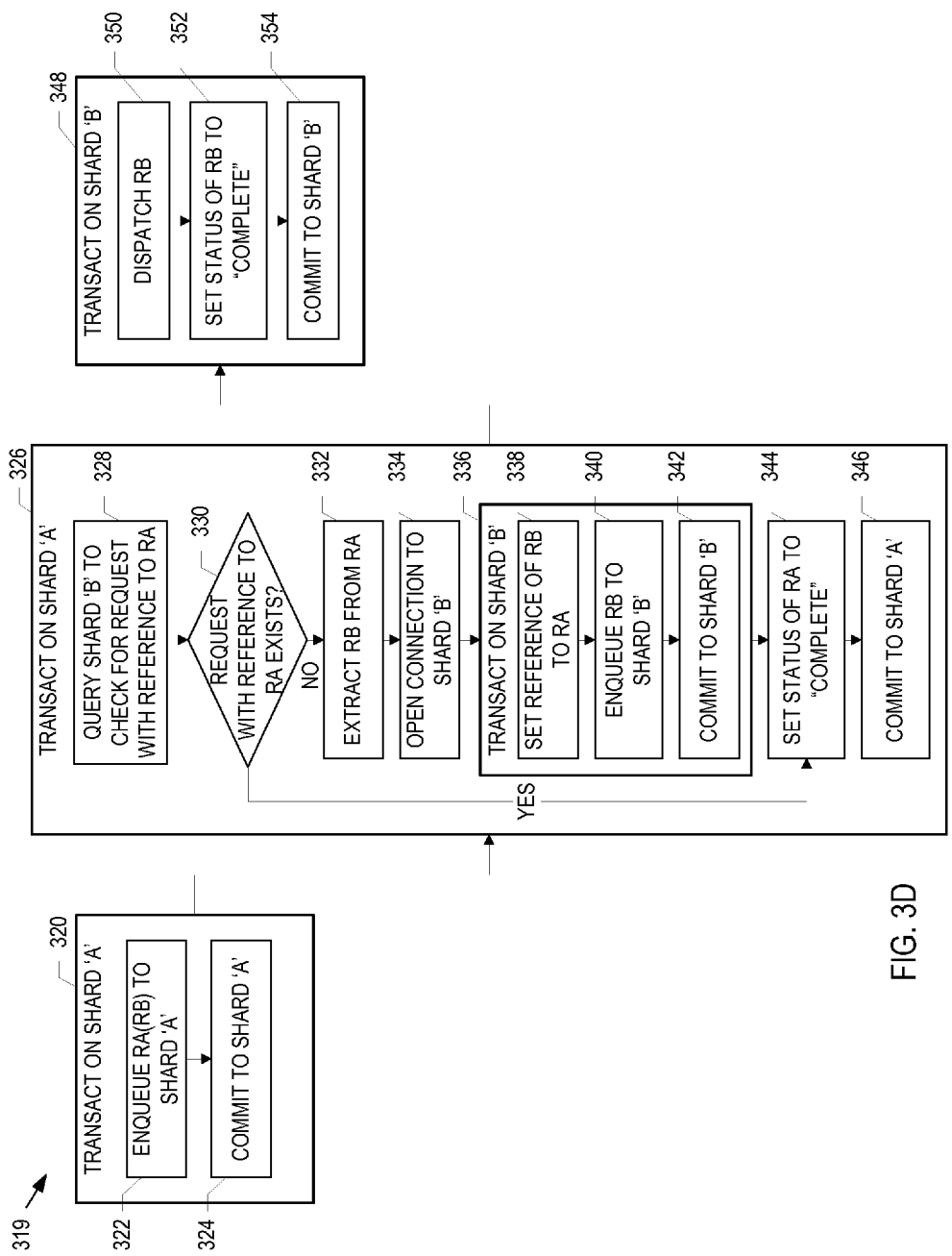
FIG. 3D is a flowchart of an example process for propagating a change at a first shard to a second shard.

FIG. 3D is a flowchart of an example process for propagating a change at a first shard to a second shard. The process includes transactions occurring on two shards, shard 'A' and shard 'B'. The process propagates a change from the records of shard 'A' to the records of shard 'B'. For example, a new order can be received at an order processing program and the order processing program can open a database connection to transact on shard 'A' in order to store the order information in the records of shard 'A'. The actions included in box 320 represent actions transacted on shard 'A'. Prior to committing a change to the records of shard 'A', a request "RA" including an embedded request "RB" to make the changes on shard 'B' is placed into the queue (enqueued) at shard 'A' (322). The changes to the records of shard 'A' are committed to shard 'A'. The database connection to shard 'A' can then be closed. For instance, in the order processing example, the database connection between the order processing program and shard 'A' can be closed. The embedded request placed in the shard 'A' queue remains there waiting to be processed by the shard 'A' queue processor.

The actions included in box 326 represent actions performed by the shard 'A' queue processor. Transacting on shard 'A' the queue processor polls the queue for requests that need to be processed. In some embodiments, the shard 'A' queue and the shard 'B' queue are database tables in the respective database shards. Upon finding the request, RA, stored in the queue table of shard 'A', the query processor issues a query of the query table of shard 'B' to determine if a there is a request present in the shard 'B' queue that has a reference to RA (328). In some embodiments, the reference is a unique number assigned by the database to the database record of RA when it was stored in the queue table.

If a request in the queue table of shard 'B' is found that includes a reference to RA, the queue processor of shard 'A' sets a status of RA to "complete" (344) and commits the change to the status of RA to the query table of shard 'A' (346). The existence of a request in the queue of shard 'B' that references shard 'A' indicates that RA has previously been processed by the queue processor. Setting the status of RA to "complete" indicates to the queue processor that no further processing of RA is required.

If no request is found in the queue of shard 'B' that references RA, then the queue processor of shard 'A' extracts the request to make the changes to shard 'B' from RA (332) and opens a database connection to shard 'B' (334). The actions included in the box 336 represent transactions occurring on shard 'B' made by the queue processor of shard 'A'. A reference of RB is set to reference RA (338), and RB is placed into the queue of shard 'B' (340). The change to the query table of shard 'B' is committed (342). The database connection to shard 'B' is closed, and the status of RA is set to "complete". The status change to the query table entry is committed to shard 'A' (346). RB remains in the queue of shard 'B' awaiting processing by the queue processor of shard 'B'.

The actions included in box 348 represent actions performed by a queue processor of shard 'B' transacting on shard 'B'. Upon polling the queue of shard 'B' and finding RB, the queue processor dispatches RB to propagate the changes initially made to shard 'A' to the records of shard 'B' (350). The status of RB is set to "complete" so that the query processor does not attempt to process RB again later (352), and the changes to the records of shard 'B' including the change to the status of RB are committed to shard 'B' (354).

FIG. 4 is a table illustrating example queue contents of two database shard queues used in the creation of an order. The queue of shard A is a database table that includes an entry 402. The entry 402 includes a queue entry identifier (Queue_ID), a request, and a referring identifier (Referring_ID). The queue can include additional fields, for example, a field to indicate whether or not the entry has been completed.

The queue entry identifier uniquely identifies the entry in the queue, although after a period of time, a queue entry identifier can be reused. In an implementation, the queue entry identifier is a serial number assigned to the entry by database software. In some implementations, the queue entry identifier includes a static prefix to identify the shard to which the queue entry identifier corresponds.

The request includes instructions to be carried out by a queue processor. In an implementation the request includes SQL statements. The referring identifier is a field for recording the queue identifier for any queue-to-queue entries placed in the queue. The field is blank for the example queue entry 402 because the example entry was not entered into the shard 'A' queue from another queue. It was placed in the shard 'A' queue via database operations at shard 'A'.

For example, entry 402 could result from a buyer having a home shard 'A' using computer 108 to place an order (Order X) with a seller having a home shard 'B'. Entry 402 is stored in the queue of shard 'A', and the order is created in the records of shard 'A'. Entry 402 then sits in the queue of shard 'A' until it is read by the queue processor of shard 'A' which polls the queue. The queue processor of shard 'A' reads entry 402. Entry 402 includes an embedded request to create the new order in the records of shard 'B'. The queue processor of shard 'A' opens a database connection to shard 'B'. Before placing the instructions to create the new order in the shard 'B' queue, the queue processor of shard 'A' performs a search of the referring identifiers of the entries in the shard 'B' queue to determine if the instructions of entry 402 have already been completed. The search queries the queue of shard 'B' for any entries having a referring identifier that matches the queue entry identifier of entry 402.

If no such entries are found, the instructions to create the new order (Order X) are stored in a new entry of the queue of shard 'B'. This results in entry 404 being placed in the queue of shard 'B'. Entry 404 includes its own queue entry identifier, a request, and a referring identifier. The referring identifier is set to the queue entry identifier of entry 402. Storing the queue entry identifier of a referring request in the referring identifier field in shard 'B' provides a back reference that permits later searching of the shard 'B' queue to determine if the request of entry 402 has already been completed.

FIG. 5 is a table illustrating example queue contents of two database shard queues used in updating an order. The example entry 502 corresponds to actions performed by the seller of example FIG. 4 to process and ultimately fulfill the order (Order X). For example, entry 502 could result from the seller, having home shard 'B', and using computer 110 to mark the order as having been shipped. The order record on shard 'B' can be updated to indicate, for example, a shipping date and a tracking number. Entry 502 is placed in the queue of shard 'B', and the order (Order X) is updated in the records of shard 'B'.

Entry 502 then sits in the queue of shard 'B' until it is read by the queue processor of shard 'B' which polls the queue. The queue processor of shard 'B' reads entry 502. Entry 502 includes an embedded request to update the order (Order X) in the records of shard 'A'. The queue processor of shard 'B' opens a database connection to shard 'A'. Before placing the instructions to update the order in the shard 'A' queue, the queue processor of shard 'B' performs a search of the referring identifiers of the entries in the shard 'A' queue to determine if the instructions of entry 502 have already been completed. The search queries the queue of shard 'A' for any entries having a referring identifier that matches the queue entry identifier of entry 502.

If no such entries are found, the instructions to update the order (Order X) are stored in a new entry of the queue of shard 'A'. This results in entry 504 being placed in the queue of shard 'A'. Entry 504 includes its own queue entry identifier, a request, and a referring identifier. The referring identifier is set to the queue entry identifier of entry 502.

To perform a series of database operations in order, as is often necessary, in an implementation actions are grouped together in the queue of a database shard. Independent requests are requests that are not grouped and have no prerequisites for their being dispatched. Grouped requests include a series of requests to be performed in order. Grouping queue entries permits database operations to be serialized. Within a group, a request is dispatchable if each of the requests in the same group enqueued prior to the request have already been dispatched and marked as complete by the queue processor. That is, prior requests in a group are prerequisites for a given request. Independent requests can be considered as a group with a single request, such that they are immediately dispatchable.

In an implementation, queue requests are grouped by assigning the same value to their grouping attribute. In an implementation, the grouping attribute is a composite column of a grouping category and a grouping id where the grouping category is a string value and the grouping id is an integer. For example, (grouping_category, grouping_id) can be set to ('customer_id', 123) meaning that the requests in this group are enqueued for the customer having a customer id value of 123 in the database system. To ensure that grouped requests are performed by the queue processor in the designated order, requests in a group are all placed into the queue of the same shard, which for the example given is the buyer (customer) shard 104A.

FIG. 6 is a table illustrating example queue contents of a database shard queue having grouping parameters. The example queue includes the previously described fields of queue entry identifier and request as well as fields for grouping category (Grouping_Category) and grouping identifier (Grouping_ID). The example queue also includes a status field indicating whether or not the given request is pending or has been completed. In the example queue shown entry 602 and entry 606 belong to the same group. This is because the grouping attribute (a composite of the grouping category and the grouping identifier) for these entries match. Both entry 602 and 606 correspond to a customer (buyer) with a customer identifier of '123'. The first entry includes an embedded request (to be placed in the shard 'B' queue) to create a new order on a buyer shard for an order placed by customer '123'. Entry 604 is unrelated to entries 602 and 606. Entry 604 includes an embedded request (to be placed in the shard 'C' queue) to update an order for a different customer.

In the example queue shown, entry 604 is immediately dispatchable. That is, the queue processor of a shard having these entries can process entry 604 upon polling the queue and reading the entry. Entry 606, however, is not dispatchable. Processing of entry 606 is conditioned upon the completion of entry 602. Entry 606 is not processed by the queue processor until entry 602 has been processed. In this example, the condition prevents an update attempt (from entry 606) of a record on shard 'B' that would not exist until entry 602 is processed. A queue processor could reach entry 606 without entry 602 having been performed, for example, due to a failed attempt to connect to shard 'B' while trying to complete entry 602.

In an implementation, to determine if a current queue entry is dispatchable, the queue processor reads the grouping parameters of the entry, the composite grouping category and grouping identifier, for example, and searches the queue for any other entries with the same grouping parameters, and a lower queue entry identifier which have not been marked as completed. If one or more such entries are found, the current queue entry is not dispatchable. If no such entries are found, the current entry is dispatchable.

Some database operations are idempotent by nature. For idempotent database operations, in an implementation an alternative process can be used for propagating changes across database shards.

Figure 7A:
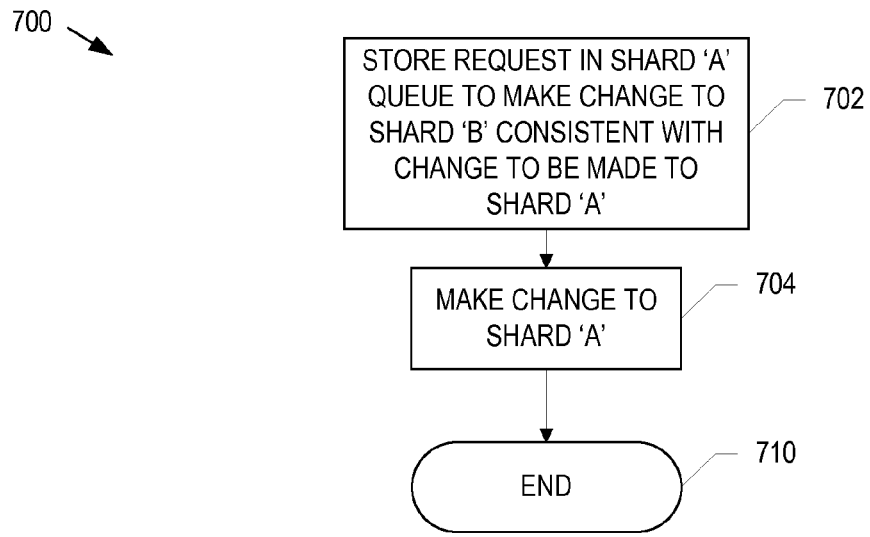
FIG. 7A is a flow chart of an example process for making a change at a database shard and enqueuing an embedded request.

FIG. 7A is a flow chart of an example process 700 for making a change at a database shard and enqueuing an embedded request. A database connection to shard 104A is opened in order to make a change to information in the records of shard 104A. A determination is made in the database system that a change to the records of shard 104A is pending that should be propagated to the records of shard 104B. The open database connection to shard 104A enables database transactions to take place on shard 104A, making shard 104A the transacting shard.

The open database connection to the transacting shard is used to store a request in the queue table 118 of the transacting shard, shard 104A, to make changes to the records 118B of shard 'B' (702). The change is made to shard 'A' (704), for example, by committing an insert or update action to change the records of shard 104A. Following the storage of the request in the queue of the transacting shard (704) and making the changes to the transacting shard (704), the database connection to the transacting shard, shard 104A, is closed and the process ends (710).

The request remains in the queue 118A of shard 104A, until it is processed (dispatched) by the queue processor 120A. The queue of a given shard can be serviced by a queue processor running on the server hardware where that shard resides, or alternatively by a queue processor running on a separate machine.

Figure 7B:
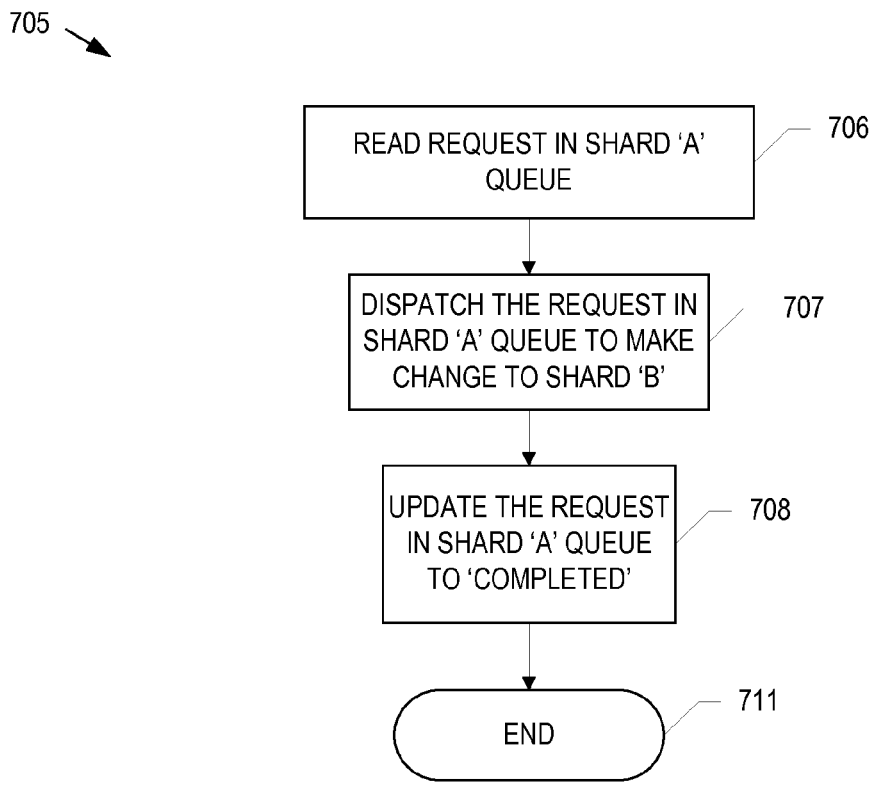
FIG. 7B is a flow chart of an example process for dispatching a request at one shard to update the records of another shard.

FIG. 7B is a flow chart of an example process 705 for dispatching a request at one shard to update the records of another shard. The process 705 can be used, for example, in combination with the process 700 to propagate a change across database shards for idempotent database operations. The queue processor 120A of server 103A polls the queue 118A of shard 104A. Upon polling the queue 118A, the queue processor 120A dispatches the request (706). In dispatching the request, the queue processor 120A opens a database connection to shard 104B and makes the changes to the records of shard 104B as indicated by the request. The queue processor 120A closes the connection to shard 104B, and marks the request in the queue 118A as completed (708) and the process ends (711).

The difference is that in the process of FIG. 3, the action of attempting to place the extracted request into the queue of the target shard is made idempotent by first checking to make sure that it does not already exist in the queue. In the process of FIG. 3, an embedded request is placed into a queue of a first shard. The embedded request is extracted and placed into the queue of a second shard (if it is not already present) for dispatch by the second shard's queue processor. In the combined process of FIGS. 7A and 7B, the records of the second shard are updated by the queue processor of the first shard directly. The queue and queue processor of the second shard are not used.

The exemplary processes of FIGS. 7A and 7B can be used where inadvertently performing a change propagation operation more than once does not affect the outcome of the operation. For example, the process can be used to in the system of FIG. 1 to replicate certain seller records from a seller shard across all of the shards of the database system for a high volume seller. For high volume sellers, creating a duplicate record of an order on the seller's shard could overburden that shard. Instead, one copy of an order is maintained in the respective buyer's shard. Seller information for the high volume seller, such as inventory, prices, current promotions and terms of service are stored on the seller shard and replicated on other shards in the database system using the process of FIG. 7A and FIG. 7B.

Replication of seller information for a high volume seller can, for example, prevent the database system from needing to later obtain this information at the time a buyer on a different shard from the seller places an order with the seller. For example, a record that includes the terms of service for the high volume seller can be changed on the seller shard and then replicated on other shards of the system. Replicating the terms of service to other shards avoids the need to later perform a cross shard query to obtain the terms of service from the seller shard.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter affecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
   determining, by a queue processor, a grouping parameter value associated with a particular queue entry;
   determining, by the queue processor, whether another queue entry (i) has a same grouping parameter value as the particular queue entry, (ii) has a lower queue entry identifier than the particular queue entry, and (iii) is designated as not completed; and
   determining, by the queue processor, whether the particular queue entry is dispatchable based on determining whether another queue entry (i) has the same grouping parameter value as the particular queue entry, (ii) has a lower queue entry identifier than the particular queue entry, and (iii) is designated as not completed.

2. The method of claim 1, comprising determining that the particular queue entry is dispatchable based on determining that no other queue entry (i) has the same grouping parameter value as the particular queue entry, (ii) has a lower queue entry identifier than the particular queue entry, and (iii) is designated as not completed.

3. The method of claim 2, comprising dispatching the particular queue entry.

4. The method of claim 1, comprising determining that the particular queue entry is not dispatchable based on determining that another queue entry (i) has the same grouping parameter value as the particular queue entry, (ii) has a lower queue entry identifier than the particular queue entry, and (iii) is designated as not completed.

5. The method of claim 4, comprising dispatching the other queue entry, then designating the other queue entry as completed, then dispatching the particular queue entry.

6. The method of claim 1, wherein the particular queue entry includes a first request involving a first shard of a database system.

7. The method of claim 6, wherein the first request comprises instructions to enqueue a second request for a second shard of the database system, the second request comprising instructions to duplicate a change to the first shard on the second shard.

8. A non-transitory computer-readable medium storing software comprising instructions executable by one or more computers which, upon such execution, cause the one or more computers to perform operations comprising:
   determining, by a queue processor, a grouping parameter value associated with a particular queue entry;
   determining, by the queue processor, whether another queue entry (i) has a same grouping parameter value as the particular queue entry, (ii) has a lower queue entry identifier than the particular queue entry, and (iii) is designated as not completed; and
   determining, by the queue processor, whether the particular queue entry is dispatchable based on determining whether another queue entry (i) has the same grouping parameter value as the particular queue entry, (ii) has a lower queue entry identifier than the particular queue entry, and (iii) is designated as not completed.

9. The medium of claim 8, the operations further comprising determining that the particular queue entry is dispatchable based on determining that no other queue entry (i) has the same grouping parameter value as the particular queue entry, (ii) has a lower queue entry identifier than the particular queue entry, and (iii) is designated as not completed.

10. The medium of claim 9, the operations further comprising dispatching the particular queue entry.

11. The medium of claim 8, the operations further comprising determining that the particular queue entry is not dispatchable based on determining that another queue entry (i) has the same grouping parameter value as the particular queue entry, (ii) has a lower queue entry identifier than the particular queue entry, and (iii) is designated as not completed.

12. The medium of claim 11, the operations further comprising dispatching the other queue entry, then designating the other queue entry as completed, then dispatching the particular queue entry.

13. The medium of claim 8, wherein the particular queue entry includes a first request involving a first shard of a database system.

14. The method of claim 13, wherein the first request comprises instructions to enqueue a second request for a second shard of the database system, the second request comprising instructions to duplicate a change to the first shard on the second shard.

15. A system comprising:
one or more computers and one or more storage devices storing instructions that are operable, when executed by the one or more computers, to cause the one or more computers to perform operations comprising:
determining, by a queue processor, a grouping parameter value associated with a particular queue entry;
determining, by the queue processor, whether another queue entry (i) has a same grouping parameter value as the particular queue entry, (ii) has a lower queue entry identifier than the particular queue entry, and (iii) is designated as not completed; and
determining, by the queue processor, whether the particular queue entry is dispatchable based on determining whether another queue entry (i) has the same grouping parameter value as the particular queue entry, (ii) has a lower queue entry identifier than the particular queue entry, and (iii) is designated as not completed.

16. The method of claim 15, comprising determining that the particular queue entry is dispatchable based on determining that no other queue entry (i) has the same grouping parameter value as the particular queue entry, (ii) has a lower queue entry identifier than the particular queue entry, and (iii) is designated as not completed.

17. The system of claim 16, the operations further comprising dispatching the particular queue entry.

18. The system of claim 15, the operations further comprising determining that the particular queue entry is not dispatchable based on determining that another queue entry (i) has the same grouping parameter value as the particular queue entry, (ii) has a lower queue entry identifier than the particular queue entry, and (iii) is designated as not completed.

19. The system of claim 18, the operations further comprising dispatching the other queue entry, then designating the other queue entry as completed, then dispatching the particular queue entry.

20. The system of claim 15, wherein the particular queue entry includes a first request involving a first shard of a database system.

* * * * *

UNITED STATES PATENT AND TRADEMARK OFFICE
CERTIFICATE OF CORRECTION

PATENT NO. : 8,443,006 B1
APPLICATION NO. : 13/525561
DATED : May 14, 2013
INVENTOR(S) : Tolga Bozkaya Page 1 of 1

It is certified that error appears in the above-identified patent and that said Letters Patent is hereby corrected as shown below:

Title Page, Item (75) (Inventors), lines 4-5, please delete "Mountian View, CA" and insert therefor -- Mountain View, CA --.

In the Claims

Column 14, line 63, Claim 14, please delete "method" and insert therefor -- medium --;

Column 15, line 20, Claim 16, please delete "method" and insert therefor -- system --.

Signed and Sealed this
Twentieth Day of August, 2013

Teresa Stanek Rea
*Acting Director of the United States Patent and Trademark Office*